United States Patent
Cohen et al.

(10) Patent No.: US 12,481,651 B1
(45) Date of Patent: Nov. 25, 2025

(54) LANGUAGE MODEL IMPROVEMENT THROUGH AUTOMATED PROMPT ENGINEERING

(71) Applicant: Intuit Inc., Mountain View, CA (US)

(72) Inventors: Linoy Cohen, Petah Tikva (IL); Udi Menkes, Petah Tikva (IL); Matan Vetzler, Petah Tikva (IL); Yakov Gazman, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/255,472

(22) Filed: Jun. 30, 2025

(51) Int. Cl.
*G06F 16/242* (2019.01)
*G06F 40/40* (2020.01)

(52) U.S. Cl.
CPC ............ *G06F 16/243* (2019.01); *G06F 40/40* (2020.01)

(58) Field of Classification Search
CPC .............................. G06F 16/243; G06F 40/40
USPC .............................................................. 704/9
See application file for complete search history.

(56) References Cited

U.S. PATENT DOCUMENTS

2025/0110807 A1\* 4/2025 Yunus ....................... G06F 9/54

\* cited by examiner

*Primary Examiner* — Thierry L Pham
(74) *Attorney, Agent, or Firm* — Lathrop GPM LLP (57) ABSTRACT

An alignment score is generated for a test language model from input data including a number of triplet data structures. The method also includes identifying, responsive to the alignment score failing to satisfy a score threshold, a fail triplet data structure in the number of triplet data structures for which the evaluation score includes the indication of fail. A judge language model is executed on the fail triplet data structure to output a type of misalignment that the test language model produced when the test language model executed on the fail prompt. The judge language model is re-executed on a combination of the fail triplet data structure and the type of misalignment to output a cause of the fail response. An enhanced prompt is generated accordingly and then returned.

20 Claims, 5 Drawing Sheets

LANGUAGE MODEL IMPROVEMENT THROUGH AUTOMATED PROMPT ENGINEERING

BACKGROUND

Large language models are a type of machine learning model used to process natural language. Such models are termed "large," because such models have many layers of neurons (function nodes) connected by billions or hundreds of billions of connections represented by parameters. Large language models have many uses, such as to summarize text, generate new text based on user prompts, perform queries on data, compare different texts, simulate conversations, and other functions.

A technical problem exists with language models. The technical problem is that large language models are subject to a phenomenon known as "hallucination." Hallucination occurs when a large language model generates output that is nonsensical, wrong, offensive, or otherwise undesirable. While model hallucination may be relatively uncommon, hallucination occurs with sufficient frequency that large language models may not be considered reliable in certain applications where a high degree of accuracy is specified.

One technique for addressing the technical problem of large language model hallucination is to require the large language model to provide an explanation or reason for the answer that the large language model provides. Such a technique may be referred to as a reasoning language model. However, the rationale or the reason may not be accurate. In other words, the rationale also may be a hallucination of the model, in addition to the output being a hallucination of the model.

One technique for addressing model hallucination in a reasoning model is for a human to evaluate the output and the reason for the output. The human may determine, based on the human's own experience, whether the output, the rationale, or both are in alignment with a human's expectations for a reasonable response to the input to the reasoning language model.

However, at an industrial scale of production, obtaining human evaluations of a reasoning language model may be impossible or impractical. Thus, a specific technical problem arises. The specific technical problem is how to program a computer to emulate, or exceed, human evaluations of the output of a language model, such as a reasoning language model.

SUMMARY

One or more embodiments provide for a method. The method includes generating an alignment score for a test language model from input data including a number of triplet data structures. Each of the number of triplet data structures includes a prompt for the test language model, a response generated by the test language model using the prompt, and an evaluation score quantifying an indication of pass or fail of the response with respect to an alignment of the response with a metric. The method also includes identifying, responsive to the alignment score failing to satisfy a score threshold, a fail triplet data structure in the number of triplet data structures for which the evaluation score includes the indication of fail. The fail triplet data structure includes a fail prompt, a fail response, and a fail score. The method also includes executing a judge language model on the fail triplet data structure to output a type of misalignment that the test language model produced when the test language model executed on the fail prompt. The method also includes re-executing the judge language model on a combination of the fail triplet data structure and the type of misalignment to output a cause of the fail response. The method also includes generating an enhanced prompt by commanding the judge language model to modify, based on the cause, the fail prompt such that, when the test language model is executed on the enhanced prompt, a new response of the test language model is predicted to be an aligned response. The method also includes returning the enhanced prompt.

One or more embodiments also provide for a system. The system includes a computer processor and a data repository in communication with the computer processor. The data repository stores input data including a number of triplet data structures including a prompt for a test language model, a response generated by the test language model using the prompt, and an evaluation score quantifying an indication of pass or fail of the response with respect to an alignment of the response with a metric. The data repository also stores an alignment score and a score threshold. The data repository also stores a fail triplet data structure in the number of triplet data structures for which the evaluation score includes the indication of fail. The fail triplet data structure includes a fail prompt, a fail response, and a fail score. The data repository also stores a type of misalignment. The data repository also stores a cause of the fail response. The data repository also stores an enhanced prompt. The data repository also stores an aligned response aligned with the metric. The system also includes an alignment engine executable by the computer processor on the input data to generate the alignment score. The system also includes a test language model executable by the computer processor. the test language model, when executed on the input data, generates at least the fail response. The test language model, when executed on the enhanced prompt, generates a new response. The system also includes a judge language model executable by the computer processor. the judge language model is executable on the fail triplet data structure to output the type of misalignment that the test language model produced when the test language model executed on the fail prompt. The judge language model is re-executable on a combination of the fail triplet data structure and the type of misalignment to output the cause of the fail response. The judge language model is also executable by the computer processor to modify, based on the cause, the fail prompt such that, when the test language model is executed on the enhanced prompt, the new response of the test language model is predicted to be the aligned response. The system also includes a server controller executable by the computer processor to identify, responsive to the alignment score failing to satisfy the score threshold, the fail triplet data structure. The server controller is also executable by the computer processor to coordinate execution of the alignment engine, the test language model, and the judge language model. The server controller is also executable by the computer processor to return the enhanced prompt.

One or more embodiments provide for another method. The method includes generating an alignment score for a test language model from a number of triplet data structures. Each of the number of triplet data structures include a prompt for the test language model, a response generated by the test language model using the prompt, and an evaluation score quantifying an indication of pass or fail of the response with respect to an alignment of the response with a metric. The method also includes identifying, responsive to the alignment score failing to satisfy a score threshold, a fail triplet data structure in the number of triplet data structures for which the evaluation score includes the indication of fail. The fail triplet data structure includes a fail prompt, a fail response, and a fail score. The method also includes executing a judge language model on the fail triplet data structure to output a type of misalignment that the test language model produced when the test language model executed on the fail prompt. The method also includes re-executing the judge language model on a combination of the fail triplet data structure and the type of misalignment to output a cause of the fail response. The method also includes generating an enhanced prompt by commanding the judge language model to modify, based on the cause, the fail prompt such that, when the test language model is executed on the enhanced prompt, a new response of the test language model is predicted to be an aligned response. The method also includes returning the enhanced prompt. The method also includes executing the test language model on the enhanced prompt. The method also includes determining that a new response of the test language model, generated by executing on the enhanced prompt, fails to align with the metric. The method also includes executing, to generate a new type of misalignment, the judge language model on a new triplet including the enhanced prompt, the new response, and a new fail score indicating failure of the new response to align with the metric. The method also includes re-executing the judge language model on a new combination of the new triplet and the new type of misalignment to output a new cause of the new fail score. The method also includes generating a new enhanced prompt by commanding the judge language model to modify, based on the new cause, the enhanced prompt such that, when the test language model is executed on the new enhanced prompt, an updated response of the test language model is predicted to be a second aligned response that more closely aligns with the metric relative to the aligned response. The method also includes returning the new enhanced prompt. The method also includes executing the test language model on the new enhanced prompt to generate an enhanced output. the enhanced output includes an alignment metric, as determined by the judge language model, that is in alignment with a metric threshold. The method also includes returning the enhanced output.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to language model improvement through automated prompt engineering. Specifically, one or more embodiments address the above-described technical problem through automatically improving the prompt to a judge large language model that is used to evaluate the alignment of answers provided by a test language model to a metric. The metric may be a set of human evaluations of the performance of the large language model, a classification model's evaluation of the performance of the large language model, or some other metric.

Generally, language models receive a command in the form of a prompt. A prompt is a set of instructions to a language model that command the language model to perform a task, as well as conditions or restrictions on the language model when performing the task. By improving the prompt to the judge language model, one or more embodiments may use the judge language model to ensure that a test language model (i.e., the language model responding to the prompt) generates a response that is aligned with a metric. If the test language model's response does not align with the metric, then the judge language model may alter the prompt to the test language model, or suggest to a user alterations to the prompt to the test language model. In this manner, the output of the test language model may be improved.

Stated differently, one or more embodiments described herein provide for a machine learning model system that transforms a small set of manual evaluations into a fully aligned automated judge that can monitor a test language model. One or more embodiments may ingest example human evaluations (prompt-response-score triplet data structures) and automatically diagnose alignment gaps between human and machine judgments. One or more embodiments then may implement targeted improvements to the test language model through a multi-technique optimization framework, and further iteratively refine the judge language model until the judge language model performs alignment predictions with near human accuracy.

Thus, one or more embodiments solve the technical problem identified above by providing a system that emulates, or exceeds, human evaluations of the output of a language model, such as a reasoning language model. The system may improve the prompt to the judge language model prior to use. The system also may improve the prompt to a test language model during use, prior to returning an answer of the test language model to a user.

In effect, one or more embodiments improve the language models themselves in that the outputs of the judge language model, the test language model, or both, are more accurate (i.e., exhibit reduced hallucination). While the improvement to the language model is accomplished via prompt engineering, as described herein, the language models are improved in that the language models exhibit improved output relative to language models that do not benefit from the enhanced prompts of one or more embodiments.

Figure 1:
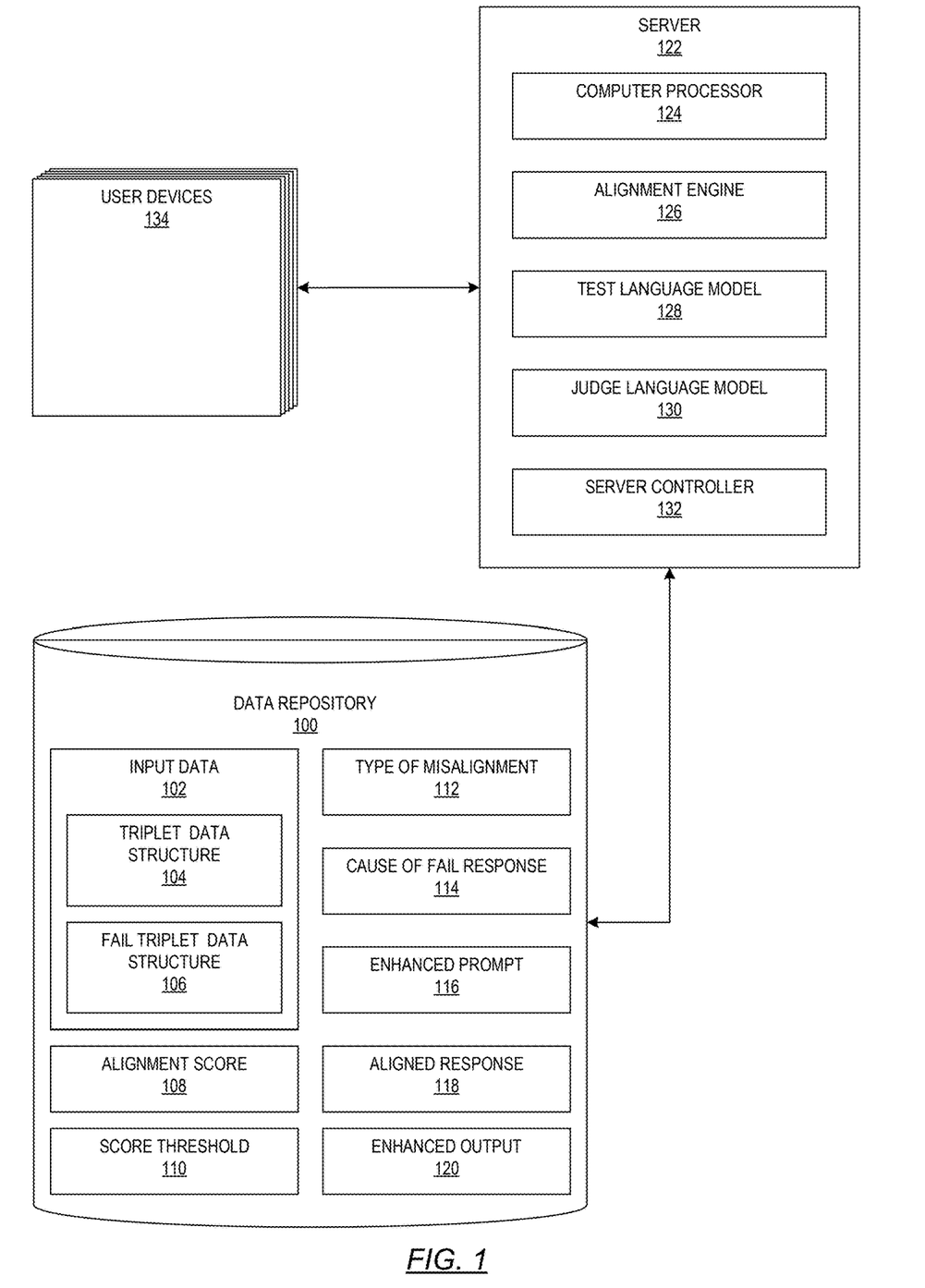
FIG. 1 shows a computing system, in accordance with one or more embodiments.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores input data (102). The input data (102) is data provided as input to an alignment engine (126). The alignment engine (126) is defined below, but briefly the alignment engine (126) determines an alignment score (108), also defined below, that indicates an alignment of the output of a language model (e.g., the test language model (128) or the judge language model (130)) with a metric. The metric, in turn, is a measure of how closely an output of the language model matches a user evaluation of the output as being either a hallucination (i.e., a fail user evaluation) or a non-hallucination (i.e., a pass user evaluation). The metric may be, for example, one or more of Scott's coefficient, Cohen's Kappa, a Pearson score, Spearman's correlation, a pass or fail indication, and combinations thereof.

Additional detail regarding the input data (102) is now described. The input data (102) may be expressed in the form of a triplet data structure (104). A triplet data structure (104) is a computer-readable data structure (e.g., data defining a computer-readable matrix or a computer-readable graph) that stores three data types. The data types include a prompt, a response generated by the test language model (128) (defined below), and an evaluation score quantifying an indication of pass or fail of the response with respect to an alignment of the response with the metric defined above.

The prompt is alphanumeric text input to a language model (e.g., the test language model (128) or the judge language model (130)). The prompt commands the language model to perform a function, or imposes limitations or conditions on how the language model is to perform the function.

The response is the output of the language model in response to the prompt. Thus, for example, the response may be the output of the test language model (128).

The evaluation score is the output of the alignment engine (126), defined below. Again, the evaluation score is one or more of the metrics defined above, or a combination thereof. The evaluation score is a computer-generated evaluation of how closely the response matches a user evaluation of the response. Thus, the evaluation score may indicate whether the response is a hallucination of the test language model (128) or an appropriate output of the test language model (128).

The input data (102) may include many instances of the triplet data structure (104). For example, the input data (102) may include multiple triplets of inputs, responses, and evaluation scores.

Some of the triplet data structures may be fail triplet data structures, such as the fail triplet data structure (106). The fail triplet data structure (106) is one of the triplet data structure (104) for which the evaluation score indicates a "fail." A "fail" is indicated when the evaluation score falls below a threshold predefined by a computer scientist user, when a human user indicates that the response in the triplet data structure is a "fail" or a hallucination, or some other indication that the response is inappropriate. Thus, a fail triplet data structure (106) is an instance of the triplet data structure (104) for which the response output by the test language model (128) is an indication of a hallucination or an indication of an inappropriate response.

Multiple instances of the fail triplet data structure (106) may be present. In an embodiment, at least some instances of the fail triplet data structure (106) are user evaluations of "fail" of a triplet data structure (104) in order to give the judge language model (130) examples of how a human user evaluates the input data (102).

Thus, a fail response may be characterized as an output of the test language model (128) to the fail prompt. The fail score further represents a measure of misalignment of the fail response relative to a metric, as determined by the judge language model (130).

The fail response also may be characterized as an output of the test language model (128) to the fail prompt. A fail prompt is a prompt to the test language model (128) that results in a fail response.

The fail score may be characterized as a measure of misalignment of the fail response relative to the metric. The metric may be received from a user, may be automatically generated as described above, or combinations thereof.

The data repository (100) also stores an alignment score (108). The alignment score (108) is an output of the alignment engine (126). In an embodiment, the alignment score (108) may be the basis for determining the fail response (e.g., a degree to which the response of the test language model (128) aligns with the metric). The alignment score (108) may be expressed as pass or fail or any of the alignment metrics described above, such as Scott's coefficient, Cohen's Kappa, a Pearson score, Spearman's correlation, or combinations thereof. The alignment score (108) is determined by the alignment engine (126), as described with respect to FIG. 2.

The data repository (100) also stores a score threshold (110). The score threshold (110) is a predetermined number which is comparable to the alignment score (108). Use of the score threshold (110) is described with respect to FIG. 2.

The data repository (100) also stores a type of misalignment (112). The type of misalignment (112) is a category assigned to a fail response. Multiple fail responses may belong to the category. Examples of the categories or types of misalignment may include a failure of the test language model (128) to express an emotion when appropriate, failure of the test language model (128) to take into account context, failure of the test language model (128) to answer a query correctly, and many others. Additional examples of the type of misalignment (112) are described with respect to FIG. 3.

The data repository (100) also may include a cause of fail response (114). The cause of fail response (114) is an output of the judge language model (130). Specifically, the cause of fail response (114) indicates a cause of why the test language model (128) output the fail response. Generation of the cause of fail response (114) is described with respect to FIG. 2.

The data repository (100) also may include an enhanced prompt (116). The enhanced prompt (116) is an output of the judge language model (130). The enhanced prompt (116) is also used as an input to the judge language model (130) during a subsequent iteration of the process described with respect to FIG. 2 in order to further enhance the enhanced prompt (116). The enhanced prompt (116) ultimately may be used as a prompt for the test language model (128) in order to improve the output of the test language model (128) during use. Generation of the enhanced prompt (116) is described with respect to FIG. 2. Examples of the enhanced prompt (116) are shown with respect to FIG. 3 and FIG. 4.

The data repository (100) also may store an aligned response (118). The aligned response (118) is a response output by the test language model (128) or by the judge language model (130) that satisfies the metric, defined above. Generation and use of the aligned response (118) is described with respect to FIG. 2. Ultimately, at the conclusion of the method of FIG. 2 (or of FIG. 3 or of FIG. 4) the response of the test language model (128) or the judge language model (130) is more likely to be an aligned response than prior to execution of the computer-implemented method. Thus, the aligned response (118) is an expression of an improvement to the test language model (128) or to the judge language model (130) by way of the enhanced prompt (116).

The data repository (100) also stores an enhanced output (120). The enhanced output (120) is an output of the test language model (128) or the judge language model (130). Specifically, the enhanced output (120) is the output of the test language model (128) or the judge language model (130) when the language model is executed on the enhanced prompt (116). Generation and use of the enhanced output (120) is described with respect to FIG. 2 and exemplified by FIG. 3 and FIG. 4.

The system shown in FIG. 1 may include other components. For example, the system shown in FIG. 1 also may include a server (122). The server (122) is one or more computer processors, data repositories, communication devices, and supporting hardware and software. The server (122) may be in a distributed computing environment. The server (122) is configured to execute one or more applications, such as the alignment engine (126), the test language model (128), the judge language model (130), or the server controller (132). An example of a computer system and network that may form the server (122) is described with respect to FIG. 5A and FIG. 5B.

The server (122) includes a computer processor (124). The computer processor (124) is one or more hardware or virtual processors which may execute computer-readable program code that defines one or more applications, such as the alignment engine (126), the test language model (128), the judge language model (130), or the server controller (132). An example of the computer processor (124) is described with respect to the computer processor(s) (502) of FIG. 5A.

The server (122) also includes an alignment engine (126). The alignment engine (126) is one or more computer-executable programs that take, as input, the input data (102) and generate, as output, the metric or the alignment score (108). In an embodiment, the alignment engine (126) includes multiple computer-executable programs that output multiple metrics, and further includes another computer-executable program that combines the multiple metrics into a single metric (e.g., a combined numerical score, an indication of pass or fail, etc.).

For example, a computer-executable program that estimates an inter-rater reliability for nominal data may be used to generate Scott's coefficient. In another example, a computer-executable program that estimates agreement between two raters who each classify N items into C mutually exclusive categories may be used to generate Cohen's Kappa. In yet another example, a computer-executable program that measures the strength and direction of linear relationships between pairs of continuous variables may be used to estimate the bivariate Pearson correlation (i.e., a Pearson score). In still another example, a computer-executable program that estimates a nonparametric measure of the monotonicity of the relationship between two data sets may be used to estimate Spearman's correlation.

The server (122) also includes language models, such as the test language model (128) and the judge language model (130). A language model is a natural language processing machine learning model, and may take the form of a neural network model. An example of a language model may be a large language model, such as CHATGPT® by OpenAI. However, different language models may be used. Use of the language models is described with respect to FIG. 2.

In particular, the server (122) may include a test language model (128). The test language model (128) is a language model that is under test (i.e., a language model under evaluation by the judge language model (130)). The test language model (128), for example, generates the triplet data structure (104) in response to input prompts.

The server (122) also may include a judge language model (130). The judge language model (130) is a language model that judges the output of the test language model (128) or its own output (i.e., the judge language model (130) judges the output of the judge language model (130)). The judge language model (130), for example, generates the fail triplet data structure (106), the alignment score (108), the type of misalignment (112), the cause of fail response (114), and the enhanced prompt (116) according to the method of FIG. 2.

In an embodiment, the test language model (128) and the judge language model (130) may be the same language model. In this case, the test language model (128) is commanded to evaluate its own output. However, the prompts provided to the language model are different when being used as the test language model (128) or the judge language model (130). Thus, for the sake of ease of reference, the test language model (128) and the judge language model (130) are referred to as being different models, regardless of whether the test language model (128) and the judge language model (130) are two separate language models or the same language model.

The server (122) also may include a server controller (132). The server controller (132) is software or application specific hardware which, when executed by the computer processor (124), controls and coordinates operation of the software or application specific hardware described herein. The server controller (132) may execute the method of FIG. 2. The server controller (132) also may control and coordinate execution of the alignment engine (126), the test language model (128), and the judge language model (130).

The system shown in FIG. 1 also may include one or more user devices (134). The user devices (134) are computing systems (e.g., the computing system (500) shown in FIG. 5A) that communicate with the server (122). The user devices (134) may transmit, for example, user prompts to the test language model (128). An example of the user devices (134) may be the user computer (400) in FIG. 4.

The user devices (134) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

Figure 2:
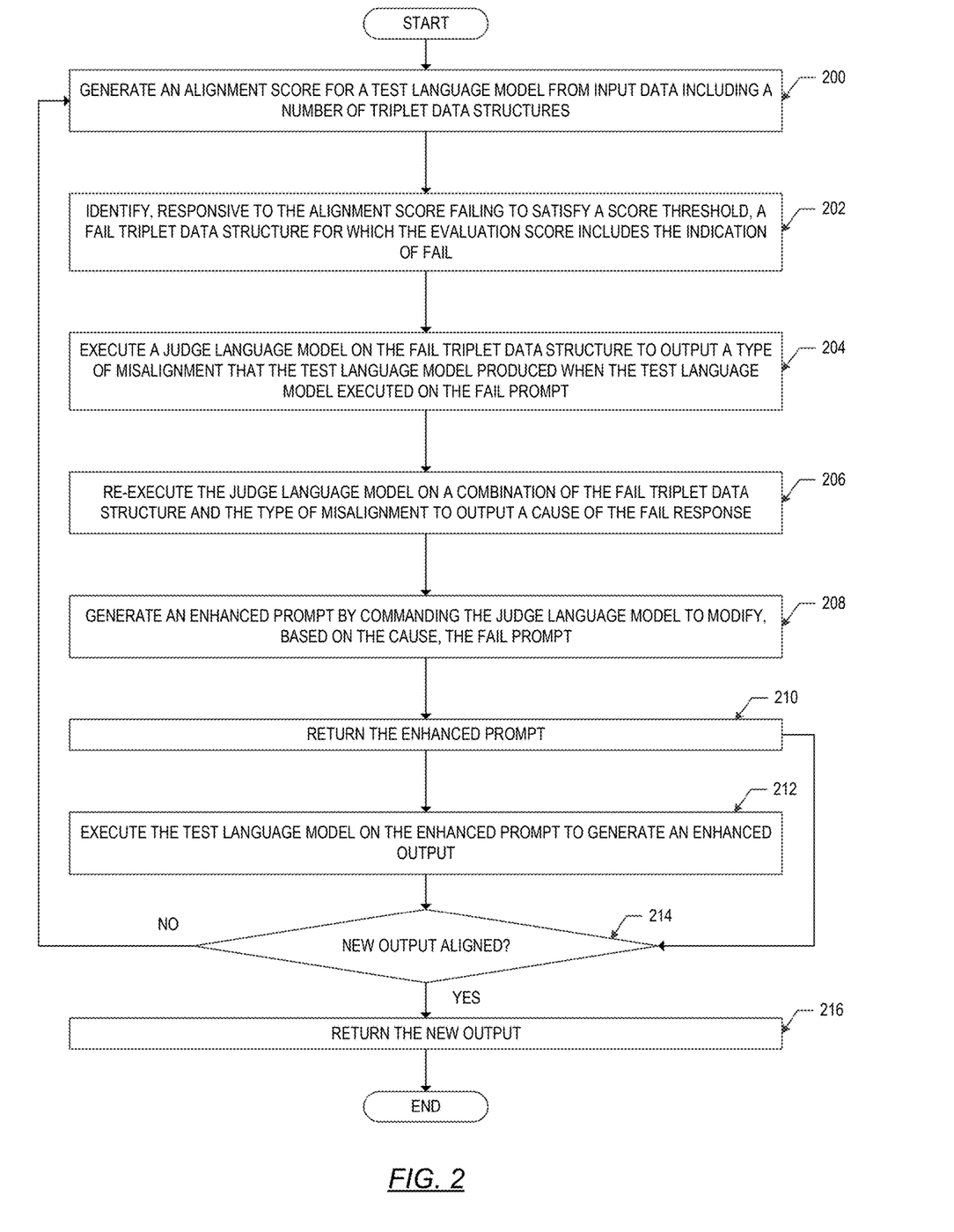
FIG. 2 shows a flowchart of a method for language model improvement through automated prompt engineering, in accordance with one or more embodiments.

FIG. 2 shows a flowchart of a method for language model improvement through automated prompt engineering, in accordance with one or more embodiments. The method of FIG. 2 may be implemented using the system of FIG. 1 and one or more of the steps may be performed on or received at one or more computer processors.

Step 200 includes generating an alignment score for a test language model from input data including a number of triplet data structures. As indicated above, each of the number of triplet data structures includes a prompt for the test language model, a response generated by the test language model using the prompt, and an evaluation score quantifying an indication of pass or fail of the response with respect to an alignment of the response with a metric.

The alignment score may be generated using one or more computer-executable programs that together may be referred to as an alignment engine. The alignment engine generates the alignment score from the triplet data structures. For example, the alignment engine may be programmed to generate the alignment score by generating one or more of Scott's coefficient, Cohen's Kappa, Pearson and Spearman's correlation coefficients, and combinations thereof.

Step 202 includes identifying, responsive to the alignment score failing to satisfy a score threshold, a fail triplet data structure in the number of triplet data structures for which the evaluation score includes the indication of fail. The fail triplet data structure includes a fail prompt, a fail response, and a fail score. Identification of the fail triplet data structure may be performed by comparing the alignment score to the score threshold. If the alignment score fails to satisfy (e.g., is less than) the score threshold, then the triplet data structure in common is marked as a fail triplet data structure. For example, a metadata flag may be added to the triplet data structure that indicates the fail status, or the triplet data structure in question may be added to a set of fail triplet data structures.

In another embodiment, the fail triplet data structure may be indicated by identifying a score of "fail" in the triplet data structure. In this case, the metadata flag or other categorization of the triplet data structure may be placed in the category of fail triplet data structures.

Step 204 includes executing a judge language model on the fail triplet data structure to output a type of misalignment that the test language model produced when the test language model executed on the fail prompt. The input to the judge language model is the fail triplet data structure, along with a prompt to the judge language model that commands the judge language model to categorize the type of misalignment of each fail triplet data structure.

Thus, for example, executing the judge language model may include generating a first judge prompt that commands the judge language model to categorize the misalignment. Then, step 204 may include executing the judge language model on the first judge prompt, together with the fail triplet data structure.

Step 206 includes re-executing the judge language model on a combination of the fail triplet data structure and the type of misalignment to output a cause of the fail response. The judge language model receives, as input, the fail triplet data structure, the type of misalignment, and a prompt that commands the judge language model to determine the cause of the misalignment between the fail prompt and the metric.

Thus, for example, re-executing the judge language model may include generating a second judge prompt that commands the judge language model to explain why the fail prompt resulted in the fail response. Then, step 206 includes executing the judge language model on the second judge prompt together with the fail triplet data structure and the type of misalignment. The output of the judge language model is text that indicates the cause of the misalignment between the fail prompt and the metric.

In another example, re-executing the judge language model further includes generating a second judge prompt that commands the judge language model to perform at least one of: counterfactual analysis, perturbation testing, and identification of discrepancies in alignment stemming from prompt misinterpretation, insufficient example, or specific quality dimension understandings. Then, step 206 includes executing the judge language model on the second judge prompt together with the fail triplet data structure and the type of misalignment. Again, the output of the judge language model is text that indicates the cause of the misalignment between the fail prompt and the metric.

Step 208 includes generating an enhanced prompt by commanding the judge language model to modify, based on the cause, the fail prompt such that, when the test language model is executed on the enhanced prompt, a new response of the test language model is predicted to be an aligned response. In other words, the judge language model is prompted to determine or predict a change to the fail prompt so that, when the modified prompt is executed by the test language model (or the judge language model) the output of the model will not be a fail prompt (i.e., the new output is predicted to align with the metric).

For example, step 208 may include generating instructions commanding the judge language model to consider the cause of the fail response and the type of misalignment and to determine at least one of: first tokens to add to the fail prompt, second tokens to subtract from the fail prompt, or changing third tokens of the fail prompt, in order to correct the misalignment. Then, step 208 includes executing the judge language model on the instructions. The output of re-executing the judge language model is the modified prompt. The modified prompt includes new instructions in the prompt, modified instructions in the prompt, fewer instructions in the prompt, or a combination thereof. The modified prompt is referred to as an enhanced prompt, because when the test language model (or judge language model) executes the enhanced prompt, the output of the model is predicted to be in better alignment with the metric.

Step 210 includes returning the enhanced prompt. Returning the enhanced prompt may include inputting the enhanced prompt to the test language model. Returning the enhanced prompt may include iterating the process (e.g., proceeding to step 212). Returning the enhanced prompt also may include storing the prompt, returning the enhanced prompt to a display device to display the enhanced prompt to a user, or performing some other computer function with the enhanced prompt.

In an embodiment, the method of FIG. 2 may terminate after step 210. However, the method may include additional steps.

For example, the method of FIG. 2 also may include steps 212 through step 216. At step 212, the test language model is executed on the enhanced prompt to generate an enhanced output. The enhanced output is associated with an increased alignment metric, as determined by the judge language model, relative to the fail response. In other words, the enhanced output is better aligned with the metric than the prior instance of the output of the test language model.

The enhanced output could be returned thereafter, or the process may proceed. In other words, the method of FIG. 2 also may terminate at step 212, or may further continue.

In an embodiment, the enhanced output at step 212 may be analyzed by the alignment engine to determine, quantitatively, whether the enhanced output is aligned with the metric. Thus, for example, at step 214, a determination is made whether the new output is aligned with the metric. If the enhanced output does not align with the metric (a "no" response at step 214), then steps 200 through 212 are repeated. However, the prompt that is modified is the prior version of the enhanced prompt. Accordingly, the enhanced prompt is further enhanced.

Therefore, in the embodiment, the method also includes executing the test language model on the enhanced prompt. The method also includes determining that a new response of the test language model, generated by executing on the enhanced prompt, fails to align with the metric. The method also includes executing, to generate a new type of misalignment, the judge language model on a new triplet comprising the enhanced prompt, the new response, and a new fail score indicating failure of the new response to align with the metric. The method also includes re-executing the judge language model on a new combination of the new triplet and the new type of misalignment to output a new cause of the new fail score. The method also includes generating a new enhanced prompt by commanding the judge language model to modify, based on the new cause, the enhanced prompt such that, when the test language model is executed on the new enhanced prompt, an updated response of the test language model is predicted to be a second aligned response that more closely aligns with the metric relative to the aligned response. The method also includes returning the new enhanced prompt.

Returning to step 214, if the new output is aligned with the metric, then the process continues to step 216. At step 216, the new output is returned. The new output may be presented to a user, or may be submitted to another executable program for further processing.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

Figure 3:
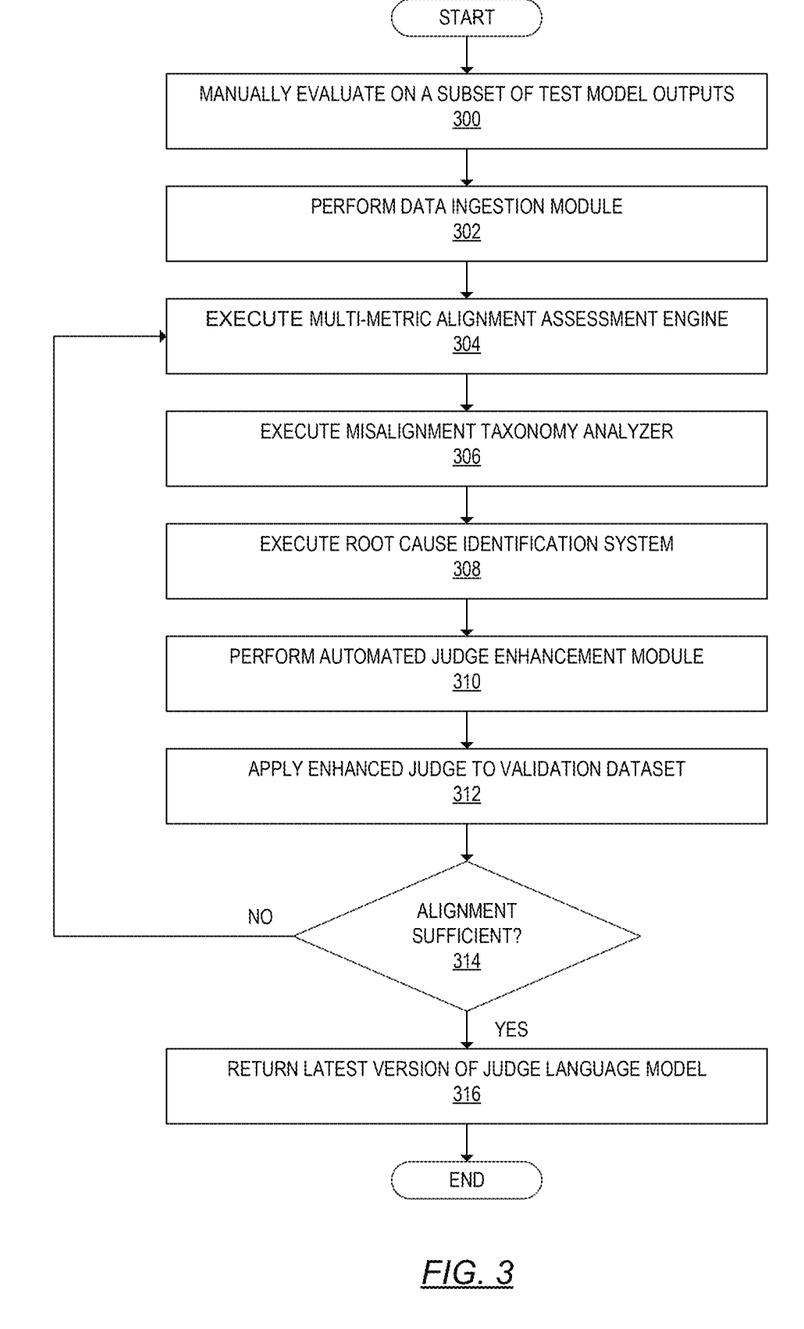
FIG. 3 shows an example of language model improvement through automated prompt engineering, in accordance with one or more embodiments.

FIG. 3 shows an example of language model improvement through automated prompt engineering, in accordance with one or more embodiments. The following example is for explanatory purposes only and not intended to limit the scope of one or more embodiments. The example of FIG. 3 may be a variation of the method of FIG. 2. The example may be implemented using the system shown in FIG. 1. The example of FIG. 3 may be characterized as a method of improving a judge language model through automated prompt engineering.

Initially, at step 300, a manual evaluation is performed on a subset of test model outputs. Trained users determine whether each of a number of outputs of a test language model is acceptable or not. Thus, for the subset of outputs, each output is marked with an indication of alignment (i.e., agrees with a user reviewer) or non-alignment (i.e., does not agree with a user reviewer).

At step 302, a data ingestion module converts the user indications into triplet data structures. The subset of outputs from step 300 from triplet data structures including a prompt, a test output, and the user-reviewer's indication of aligned or misaligned. Remaining test outputs are automatically judged by a judge language model. Thus, the remaining test outputs (practically, the vast majority of test outputs) are converted into triplet data structures, each including a prompt, a test output, and a score indicative of the alignment of the prompt and the output with respect to a metric (as described above).

The subset of triplet data structures from step 300 from a calibration subset. The remaining subset of triple data structures form a validation subset.

At step 304, a multi-metric assessment engine executes on the validation subset and on the calibration subset. The multi-metric assessment engine computes initial alignments between the validation and calibration subsets using an adaptive combination of metrics. The metrics may include one or more of Scott's coefficient (accounting for chance agreement), Cohen's Kappa, (measuring inter-rater reliability), Pearson correlation and Spearman's correlation coefficients (quantifying scoring relationships), and other hybrid metrics based on task characteristics.

Unlike existing approaches that rely on single metrics, the multi-metric assessment engine selects and weights different alignment metrics based on evaluation task characteristics. Thus, the multi-metric assessment engine provides a more comprehensive and task-appropriate measurement of alignment.

At step 306, a misalignment taxonomy analyzer identifies, using the metrics, fail triplet data structures for which the alignment score is a fail. Then, the misalignment taxonomy analyzer categorizes the fail triplet data structures into structured patterns (e.g., severity of inflation or deflation, criteria misinterpretation, context insensitivity, etc.) The misalignment taxonomy analyzer maintains a dynamic taxonomy of misalignment types that may expand with new patterns during iterations of the method of FIG. 3.

The misalignment taxonomy analyzer introduces a structured classification system for categorizing different types of judgment discrepancies. In this manner, the misalignment taxonomy analyzer provides for targeted improvements based on specific misalignment patterns. The taxonomy may evolve dynamically as the system encounters new types of misalignments.

At step 308, the root cause identification system analyzes fail triplet data structures in view of the misalignment types identified at step 306. The root cause identification system employes counterfactual analysis and controlled perturbation testing to pinpoint underlying causes of misalignment. The root cause identification system also may identify whether discrepancies between the prompts and fail outputs stem from prompt misinterpretation, stem from insufficient examples in the prompt, or specific quality dimension misunderstandings. The root cause identification system systematically isolates variables that contribute to the divergence between user judgement and large language model outputs.

At step 310, an automated judge enhancement module improves the prompts that the judge language model used to compare the validation dataset to the calibration dataset. The automated judge enhancement module uses an adaptive rating scale optimization that automatically selects from binary, discrete, or continuous scales based on task characteristics. The automated judge enhancement module may use a multi-stage chain-of-thought prompting modification with progressive decomposition of evaluation criteria. The automated judge enhancement module may use explanation field integration with specific reasoning requirements to improve the prompts to the judge language model. The automated judge enhancement module may add context-optimized few-shot learning examples to the prompt to the judge language model. The automated judge enhancement module may provide for a confidence-aware evaluation that flags uncertain judgments for additional reasoning or additional changes to the prompt to the judge language model.

The result of step 310 is one or more improved prompts to the judge language model. Each type of misalignment may be associated with a different prompt, and different prompts may have different improvements depending on the type of prompt and the outputs of the automated judge enhancement module.

Thereafter, at step 312, the enhanced judge (i.e., the judge language model commanded by the enhanced prompts generated at step 210) is applied to the validation dataset. In other words, the judge language model again compares the validation and the calibration datasets and determines which of the validation datasets are aligned, based on the comparison to the calibration datasets.

An overall alignment score is generated for the judge language model, the alignment score indicating an assessment whether the judge language model accurately evaluates the misaligned triplet data structures relative to the calibration triplet data structures.

If the alignment score satisfies a threshold, then the alignment is sufficient at step 314. Otherwise, at step 314, the alignment is deemed insufficient. If the alignment score is insufficient, then the process returns to step 304 and repeats. Otherwise, if the alignment score is sufficient, then the method continues.

At step 316, the latest version of the judge language model is returned. The judge language model is considered ready for deployment, together with the available prompt enhancements generated for the judge language model. Alternatively, returning the judge language model may include applying the judge language model to the validation dataset and using the results to apply labels to the validation dataset as aligned or misaligned with a metric (in this case, the metric is examples of user evaluations). In another embodiment, returning the judge language model may be storing the judge language model for evaluating future triplet data structures in order to categorize the future triplet data structures as being aligned or misaligned with the metric.

An example of enhancing a judge language model is now provided. A first iteration of steps 304 to 314 is performed. The alignment process begins with the data ingestion module processing a dataset of 150 customer service chat responses with corresponding human evaluations. Each evaluation includes a customer query, agent response, and a binary pass/fail score from human evaluators based on accuracy, relevance, and tone.

Next, the multi-metric alignment assessment engine is applied to the dataset. Multi-criteria scoring is performed, resulting in a score on a 1-5 scale across multiple dimensions for each of the triplet data structures in the dataset. The initial prompt structure of the judge language model includes basic instructions without chain-of-thought reasoning. No examples are provided in the prompt.

The multi-metric alignment assessment engine calculates the initial alignment between the automated judge and manual evaluations. The initial alignment metrics includes a Cohen's Kappa of 0.03 (near-random agreement), a Pearson Correlation of 0.12 (very weak correlation), and an accuracy rate of 5.3% (only 8 out of 150 evaluations matched).

A misalignment taxonomy analysis is performed, identifying patterns in the disagreements between user and automated evaluations. A scale mismatch is identified. The judge language model's 1-5 rating scale creates ambiguity when translated to binary decisions, with ratings of 3 particularly problematic. A criteria weighting discrepancy is identified in that the judge weighs all criteria equally while user evaluators prioritize domain accuracy and customer experience. Additionally, the judge language model evaluates responses in isolation, missing conversational context crucial to human evaluators. Furthermore, the judge language model has a domain knowledge gap in that the judge lacks sufficient understanding of product-specific requirements that human evaluators intuitively apply.

Next, the root cause identification system performs controlled perturbation testing by systematically varying aspects of the judge's configuration and observing the impact on alignment. The results include a primary factor that a fundamental mismatch exists between multi-criteria scoring system and binary human decisions. The results include a secondary factor of a lack of explicit reasoning framework for evaluation. The results include a tertiary factor of an insufficient representation of domain-specific evaluation criteria. The results indicate a 27% alignment with the metric.

Thus, the alignment is not sufficient (e.g., at step 314). Thus, the process is iterated. Based on the root cause analysis, the automated judge enhancement module implements the following changes. A first change is a rating scale transformation in that the 1-5 Likert scale is replaced with a binary pass or fail test, which more closely matches user evaluation methodology. A second change is chain-of-thought integration. Specifically, the judge language model is required to provide, as part of output, structured reasoning to explicitly consider specific criteria before making a determination. Third, the prompt is enhanced to account for the changes. For example, the enhanced prompt may state:

"Evaluate whether this customer service response PASSES or FAILS based on the following criteria." The criteria may be, for example: Step 1, Assess accuracy—Does the response provide factually correct information about QuickBooks? Step 2, Assess relevance—Does the response directly address the customer's question? Step 3, Assess completeness—Does the response provide all necessary information? Step 4, Assess tone—Is the response professional and appropriate? For each step, provide your reasoning with specific evidence from the response. Then make your final Pass/Fail determination based on these assessments."

Next, alignment is improved. The iterative refinement loop tests the revised judge language model and measures the improvement. The updated metrics now include new updated alignment metrics of Cohen's Kappa of 0.22 (fair agreement) and an accuracy of 27%. The evaluation still fails the metric, so the process iterates yet again.

In particular, the misalignment taxonomy analyzer identifies three persisting patterns of disagreement. The first pattern of disagreement is a contextual understanding in that the judge still evaluates responses in isolation, missing the conversation history that human evaluators consider. The second pattern of disagreement is domain knowledge application; namely, the judge language model lacks a specific understanding of evaluation criteria. The third pattern of disagreement stems from a need for a nuanced judgment calibration. In particular, the judge language model applies criteria differently than human evaluators, particularly for borderline cases.

To address the remaining gaps, the system expands criteria definitions by enhancing the detail in each evaluation criterion to better reflect user judgment standards. Additionally, the prompt is further enhanced to include representative few-shot examples. In other words, the enhanced prompt now includes specific examples demonstrating the correct evaluation process for various scenarios, particularly focusing on borderline cases where user and automated evaluations previously disagreed. An example of a few-shot prompt example may be as follows:

"Customer: 'I'm trying to reconcile my bank account but Financial App keeps showing an error code 15-223. What does that mean?' LLM Response: 'I understand you're having trouble reconciling your account. Error 15-223 typically means there's a connectivity issue with your bank. Let's try clearing your browser cache first and then reconnecting to your bank.' Evaluation: PASS Reasoning: The response correctly identifies the error code meaning, shows empathy for the customer's frustration, and provides a specific troubleshooting step."

Another example of a few-shot prompt example may be as follows:

"Customer: 'How do I add a new vendor to Financial App?' LLM Response: 'You'll need to go to the Expenses tab to add a vendor.' Human Evaluation: FAIL Reasoning: While technically accurate, this response is incomplete. It doesn't provide the full step-by-step process, lacking crucial details about selecting 'Vendors' and completing the required fields. The brevity makes it unusable for most customers."

After implementing the changes in the second iteration, the alignment metrics show significant improvement. The updated alignment metrics are Cohen's Kappa: 0.58 (moderate agreement) and Exact Match Rate: 61.3%. However, the metrics do not indicate sufficient alignment. Thus, a third iteration is performed.

In particular, despite substantial improvement, several misalignment patterns persist. First, there is an emotional intelligence gap in that the judge language model fails to recognize when responses lack appropriate empathy for customer frustration. Second, there are issues with domain-specific nuances in that the judge language model misses certain product-specific requirements that user evaluators flag. Third, the judge language model has a problem with redundancy detection in that the judge language model does not adequately penalize repetitive or circular responses.

Next, the misalignment taxonomy analyzer categorizes the remaining misalignments into structured patterns. The patterns include an emotional response inadequacy in that the judge language model overlooks missing empathy in several triplet data structures where user evaluators marked responses as "fail." The patterns include domain context errors in which the judge language model passes responses with incorrect product references in several fail responses. The patterns further include an indication of conversation flow disruption in that the judge language model passes responses that repeat questions or fail to move the conversation forward in several fail responses.

Thus, the automated judge enhancement module updates the judge language model prompt with targeted instructions addressing these specific issues. The enhanced prompt is modified to include an emotional awareness instruction. The prompt may be modified by adding the following statement, "If the customer expresses frustration, confusion, or urgency, the response MUST acknowledge these emotions appropriately. Responses that technically answer the question but completely ignore clear emotional cues should FAIL."

The enhanced prompt is also modified to increase product specificity. The prompt may be modified by adding the following statement, "Verify that the response matches the specific Financial App product the customer is using. Responses that give instructions for App1 when the customer is using App2 (or vice versa) must FAIL for domain inaccuracy."

The enhanced prompt also may include an instruction regarding conversation progression. The prompt may be modified by adding the following statement, "Evaluate whether the response moves the conversation forward. Responses that are repetitive, ask already-answered questions, or fail to provide new information when needed should FAIL."

After the third iteration, the multi-metric alignment assessment engine again evaluates the performance of the judge language model with respect to the available triple data structures. The judge language model with the prior enhanced prompt configuration produces further alignment improvement. Specifically, the updated alignment metrics are Cohen's Kappa: 0.65 (substantial agreement) and an exact match rate of 73.3% (110 out of 150 evaluations matched). Nevertheless, the metrics are determined to be insufficient relative to a desired metric of 80% alignment. Thus, a fourth iteration is performed.

In the fourth iteration, the misalignment taxonomy analyzer identifies two new types of fail triplet data structures when the judge language model is executed on the prior prompt. Three issues are identified. The first issue deals with name and placeholder handling in that the judge language model passes responses using incorrect customer names or placeholder text. The second issue deals with the verification step redundancy in that the judge language model inconsistently evaluates unnecessary repeated verification requests. The third issue deals with inadvertent contradictions in that the judge language model misses when responses contradict previously provided information.

The system implements comprehensive updates addressing all identified misalignment patterns. The prompt is further enhanced to integrate all identified gaps into a structured evaluation framework with explicit instructions for each misalignment category.

The prompt is enhanced by adding names and placeholders. For example, the prompt may include the following statement, "FAIL any response that uses incorrect customer names or leaves placeholder text (e.g., [Customer Name]) unfilled."

The prompt is further enhanced to include a verification protocol. For example, the prompt may include the following statement, "If the customer has already provided verification details, the response should not redundantly ask for them again. Repeated, irrelevant verification requests should FAIL."

The prompt is further enhanced to include contextual consistency. For example, the prompt may include the following statement, "Evaluate the response in the context of the entire conversation. FAIL responses that contradict information previously established in the conversation."

The prompt is further enhanced to address clarity and brevity. For example, the prompt may include the following statement, "Responses must be clear, concise, and free of unnecessary text. Overly verbose responses that obscure the key information should FAIL."

The prompt is further enhanced to address a complete instruction set. For example, the prompt may include the following statement, "If the response refers to steps or processes, it must provide complete, actionable information. Responses with vague or partial instructions should FAIL."

The prompt is further enhanced to add still further few-shot examples. Specifically, the few-shot examples demonstrate correct evaluations for the most persistently misaligned cases.

Finally, the prompt is further enhanced to implement a two-stage evaluation process where the judge language model first makes an assessment, then reviews its own reasoning before finalizing the decision.

After the fourth iteration, the multi-metric assessment engine may make an alignment determination. After the fourth iteration, the alignment metrics are reevaluated. The Cohen's Kappa score is 0.75 (substantial agreement). The exact match rate is 82.0% (123 out of 150 evaluations matched). Because 80% alignment meets or exceeds the threshold metric, the iterative process is completed.

The enhanced prompt, which includes the additional commands added during the four iterations, is then returned. For example, the enhanced prompt may be used by the test language model when new queries are received. The new queries are added to the enhanced prompt, and the results returned to a user. In another example, the enhanced prompt may be used by the judge language model to evaluate answers by the test language model. In this case, the results of the test language model are returned if the judge language model determines a "pass" score for the test language model. Otherwise, the query may be routed to a human technician or to a more sophisticated language model.

Figure 4:
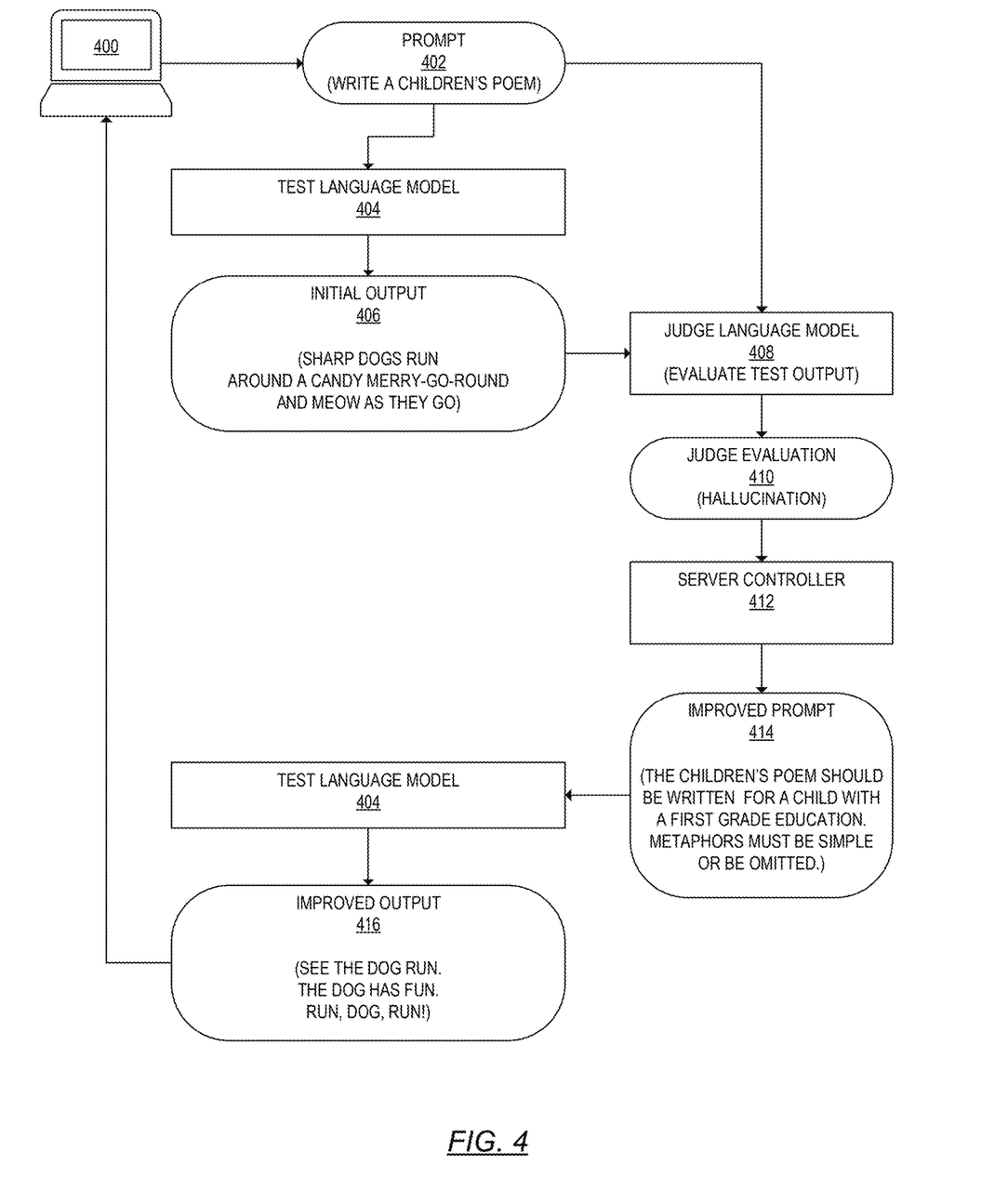
FIG. 4 shows an example of language model improvement through automated prompt engineering, in accordance with one or more embodiments.

FIG. 4 shows a use case example of language model improvement through automated prompt engineering, in accordance with one or more embodiments. The following example is for explanatory purposes only and not intended to limit the scope of one or more embodiments. The example may be a variation of the method of FIG. 2. The example may be implemented using the system shown in FIG. 1.

A user computer (400) submits a prompt (402) to a test language model (404). The prompt states, "write a children's poem." Thus, the test language model (404) is commanded to generate a children's poem.

The initial output (406) of the test language model (404) is the text, "sharp dogs run around a candy merry-go-round and meow as they go." Before being returned to the user computer (400), the initial output (406) is provided as input to the judge language model (408). The judge language model (408) uses an enhanced prompt (e.g., as described with respect to FIG. 1 through FIG. 3) to evaluate the initial output (406). The judge language model (408) outputs a judge evaluation (410). The judge evaluation (410) is that the initial output (406) is a hallucination. Specifically, the judge evaluation (410) includes a score that indicates that the initial output (406) fails one or more evaluation criteria specified in the enhanced prompt.

The judge evaluation (410) is provided to the server controller (412). The server controller (412) generates an improved prompt (414) using the techniques described above for enhancing the prompt. The improved prompt (414) includes the initial prompt (402) (i.e., "write a children's poem). However, the improved prompt (414) also includes additional instructions to the language model. In the example, the additional instructions are, "The children's poem should be written for a child with a first grade education. Metaphors must be simple or omitted."

The improved prompt (414) is returned to the test language model (404). The language model (404) executes on the improved prompt (414). Because the language model (404) has more detailed instructions, the test language model (404) returns a more appropriate response in the form of the improved output (416). The improved output (416) now reads as follows, "See the dog run. The dog has fun. Run, dog, run!"

In an embodiment, the improved output (416) is returned to the user computer (400). However, in another embodiment, the improved output (416) may be returned to the judge language model (408) and the process repeated. The process may be iterated multiple times until the judge evaluation (410) indicates a "pass" score. Once the improved output (416) has achieved the pass score, then the improved output (416) is returned to the user computer (400).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
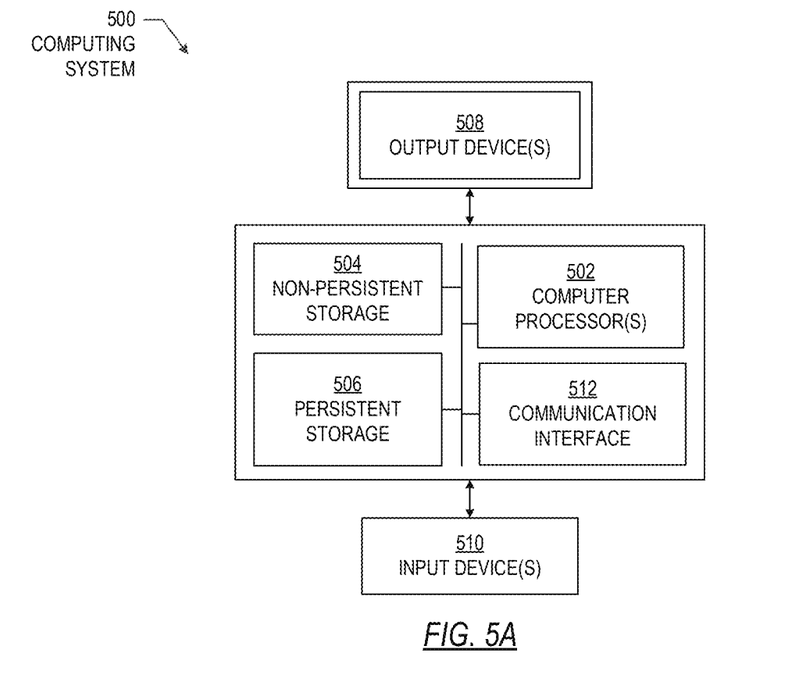
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN), such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer-readable program code to perform embodiments may be stored, in whole or in part, temporarily or permanently, on a non-transitory computer-readable medium, such as a solid state drive (SSD), compact disk (CD), digital video disk (DVD), storage device, a diskette, a tape, flash memory, physical memory, or any other computer-readable storage medium. Specifically, the software instructions may correspond to computer-readable program code that, when executed by the computer processor(s) (502), is configured to perform one or more embodiments, which may include transmitting, receiving, presenting, and displaying data and messages described in the other figures of the disclosure.

Figure 5B:
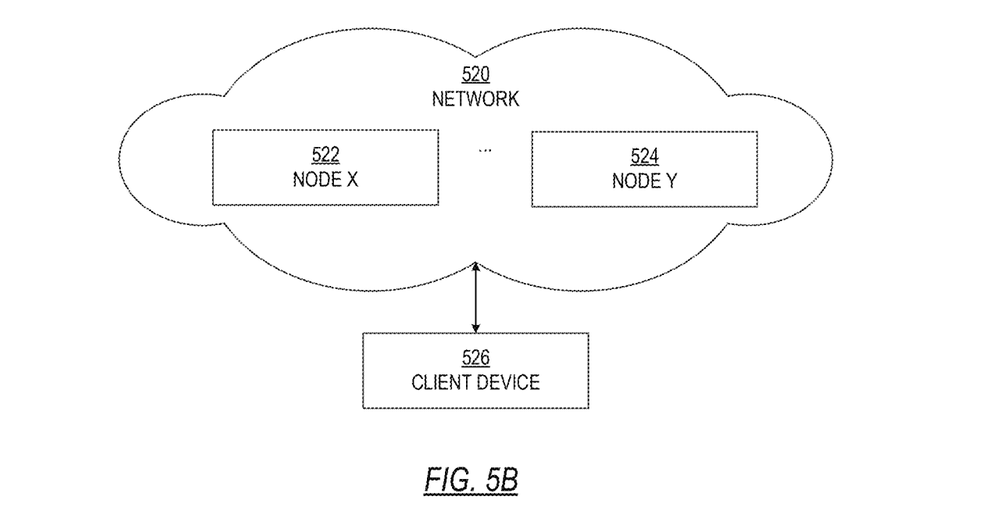

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    generating an alignment score for a test language model from input data comprising a plurality of triplet data structures,
        wherein each of the plurality of triplet data structures comprises a prompt for the test language model, a response generated by the test language model using the prompt, and an evaluation score quantifying an indication of pass or fail of the response with respect to an alignment of the response with a metric;
    identifying, responsive to the alignment score failing to satisfy a score threshold, a fail triplet data structure in the plurality of triplet data structures for which the evaluation score comprises the indication of fail, wherein the fail triplet data structure comprises a fail prompt, a fail response, and a fail score;
    executing a judge language model on the fail triplet data structure to output a type of misalignment that the test language model produced when the test language model executed on the fail prompt;
    re-executing the judge language model on a combination of the fail triplet data structure and the type of misalignment to output a cause of the fail response;
    generating an enhanced prompt by commanding the judge language model to modify, based on the cause, the fail prompt such that, when the test language model is executed on the enhanced prompt, a new response of the test language model is predicted to be an aligned response; and
    returning the enhanced prompt.

2. The method of claim 1, further comprising:
    executing the test language model on the enhanced prompt to generate an enhanced output, wherein the enhanced output comprises an increased alignment metric, as determined by the judge language model, relative to the fail response; and
    returning the enhanced output.

3. The method of claim 1, wherein generating the alignment score comprises generating one or more of Scott's coefficient, Cohen's Kappa, Pearson and Spearman's correlation coefficients, and combinations thereof.

4. The method of claim 1,
wherein the fail response comprises an output of the test language model to the fail prompt, and
wherein the fail score further comprises a measure of misalignment of the fail response relative to the metric, as determined by the judge language model.

5. The method of claim 1,
wherein the fail response comprises an output of the test language model to the fail prompt, and
wherein the fail score further comprises a measure of misalignment of the fail response relative to the metric, as received from a user.

6. The method of claim 1, wherein executing the judge language model further comprises:
generating a first judge prompt that commands the judge language model to categorize the misalignment, and
executing the judge language model on the first judge prompt together with the fail triplet data structure.

7. The method of claim 1, wherein re-executing the judge language model further comprises:
generating a second judge prompt that commands the judge language model to explain why the fail prompt resulted in the fail response, and
executing the judge language model on the second judge prompt together with the fail triplet data structure and the type of misalignment.

8. The method of claim 1, wherein re-executing the judge language model further comprises:
generating a second judge prompt that commands the judge language model to perform at least one of: counterfactual analysis, perturbation testing, and identification of discrepancies in alignment stemming from prompt misinterpretation, insufficient example, or specific quality dimension understandings, and
executing the judge language model on the second judge prompt together with the fail triplet data structure and the type of misalignment.

9. The method of claim 1, wherein generating the enhanced prompt further comprises:
generating instructions commanding the judge language model to consider the cause of the fail response and the type of misalignment and to determine at least one of: first tokens to add to the fail prompt, second tokens to subtract from the fail prompt, or changing third tokens of the fail prompt, in order to correct the misalignment, and
generating the enhanced prompt further comprises executing the judge language model on the instructions.

10. The method of claim 1, further comprising:
executing the test language model on the enhanced prompt;
determining that a new response of the test language model, generated by executing on the enhanced prompt, fails to align with the metric;
executing, to generate a new type of misalignment, the judge language model on a new triplet comprising the enhanced prompt, the new response, and a new fail score indicating failure of the new response to align with the metric;
re-executing the judge language model on a new combination of the new triplet and the new type of misalignment to output a new cause of the new fail score;
generating a new enhanced prompt by commanding the judge language model to modify, based on the new cause, the enhanced prompt such that, when the test language model is executed on the new enhanced prompt, an updated response of the test language model is predicted to be a second aligned response that more closely aligns with the metric relative to the aligned response; and
returning the new enhanced prompt.

11. A system comprising:
a computer processor;
a data repository in communication with the computer processor and storing:
input data comprising a plurality of triplet data structures comprising a prompt for a test language model, a response generated by the test language model using the prompt, and an evaluation score quantifying an indication of pass or fail of the response with respect to an alignment of the response with a metric,
an alignment score,
a score threshold,
a fail triplet data structure in the plurality of triplet data structures for which the evaluation score comprises the indication of fail, wherein the fail triplet data structure comprises a fail prompt, a fail response, and a fail score,
a type of misalignment,
a cause of the fail response,
an enhanced prompt, and
an aligned response aligned with the metric;
an alignment engine executable by the computer processor on the input data to generate the alignment score;
a test language model executable by the computer processor, wherein:
the test language model, when executed on the input data, generates at least the fail response, and
the test language model, when executed on the enhanced prompt, generates a new response;
a judge language model executable by the computer processor, wherein:
the judge language model executable on the fail triplet data structure to output the type of misalignment that the test language model produced when the test language model executed on the fail prompt,
the judge language model is re-executable on a combination of the fail triplet data structure and the type of misalignment to output the cause of the fail response, and
modify, based on the cause, the fail prompt such that, when the test language model is executed on the enhanced prompt, the new response of the test language model is predicted to be the aligned response; and
a server controller executable by the computer processor to:
identify, responsive to the alignment score failing to satisfy the score threshold, the fail triplet data structure,
coordinate execution of the alignment engine, the test language model, and the judge language model, and
return the enhanced prompt.

12. The system of claim 11, wherein the server controller is further executable by the computer processor to:
execute the test language model on the enhanced prompt to generate an enhanced output, wherein the enhanced output comprises an increased alignment metric, as determined by the judge language model, relative to the fail response; and
return the enhanced output.

13. The system of claim 11, wherein the alignment engine is programmed to generate the alignment score by generating one or more of Scott's coefficient, Cohen's Kappa, Pearson and Spearman's correlation coefficients, and combinations thereof.

14. The system of claim 11,
   wherein the fail response comprises an output of the test language model to the fail prompt, and
   wherein the fail score further comprises a measure of misalignment of the fail response relative to the metric, as either 1) determined by the judge language model or 2) received from a user.

15. The system of claim 11, wherein executing the judge language model further comprises:
   generating a first judge prompt that commands the judge language model to categorize the misalignment, and
   executing the judge language model on the first judge prompt together with the fail triplet data structure.

16. The system of claim 11, wherein re-executing the judge language model further comprises:
   generating a second judge prompt that commands the judge language model to explain why the fail prompt resulted in the fail response, and
   executing the judge language model on the second judge prompt together with the fail triplet data structure and the type of misalignment.

17. The system of claim 11, wherein re-executing the judge language model further comprises:
   generating a second judge prompt that commands the judge language model to perform at least one of: counterfactual analysis, perturbation testing, and identification of discrepancies in alignment stemming from prompt misinterpretation, insufficient example, or specific quality dimension understandings, and
   executing the judge language model on the second judge prompt together with the fail triplet data structure and the type of misalignment.

18. The system of claim 11, wherein:
   generating the enhanced prompt further comprises generating instructions commanding the judge language model to consider the cause of the fail response and the type of misalignment and to determine at least one of: first tokens to add to the fail prompt, second tokens to subtract from the fail prompt, or changing third tokens of the fail prompt, in order to correct the misalignment, and
   generating the enhanced prompt further comprises executing the judge language model on the instructions.

19. The system of claim 11, wherein the server controller is further executable by the computer processor to:
   execute the test language model on the enhanced prompt;
   determine that a new response of the test language model, generated by executing on the enhanced prompt, fails to align with the metric;
   execute, to generate a new type of misalignment, the judge language model on a new triplet comprising the enhanced prompt, the new response, and a new fail score indicating failure of the new response to align with the metric;
   re-execute the judge language model on a new combination of the new triplet and the new type of misalignment to output a new cause of the new fail score;
   generate a new enhanced prompt by commanding the judge language model to modify, based on the new cause, the enhanced prompt such that, when the test language model is executed on the new enhanced prompt, an updated response of the test language model is predicted to be a second aligned response that more closely aligns with the metric relative to the aligned response; and
   return the new enhanced prompt.

20. A method comprising:
   generating an alignment score for a test language model from a plurality of triplet data structures,
      wherein each of the plurality of triplet data structures comprise a prompt for the test language model, a response generated by the test language model using the prompt, and an evaluation score quantifying an indication of pass or fail of the response with respect to an alignment of the response with a metric;
   identifying, responsive to the alignment score failing to satisfy a score threshold, a fail triplet data structure in the plurality of triplet data structures for which the evaluation score comprises the indication of fail, wherein the fail triplet data structure comprises a fail prompt, a fail response, and a fail score;
   executing a judge language model on the fail triplet data structure to output a type of misalignment that the test language model produced when the test language model executed on the fail prompt;
   re-executing the judge language model on a combination of the fail triplet data structure and the type of misalignment to output a cause of the fail response;
   generating an enhanced prompt by commanding the judge language model to modify, based on the cause, the fail prompt such that, when the test language model is executed on the enhanced prompt, a new response of the test language model is predicted to be an aligned response;
   returning the enhanced prompt;
   executing the test language model on the enhanced prompt;
   determining that a new response of the test language model, generated by executing on the enhanced prompt, fails to align with the metric;
   executing, to generate a new type of misalignment, the judge language model on a new triplet comprising the enhanced prompt, the new response, and a new fail score indicating failure of the new response to align with the metric;
   re-executing the judge language model on a new combination of the new triplet and the new type of misalignment to output a new cause of the new fail score;
   generating a new enhanced prompt by commanding the judge language model to modify, based on the new cause, the enhanced prompt such that, when the test language model is executed on the new enhanced prompt, an updated response of the test language model is predicted to be a second aligned response that more closely aligns with the metric relative to the aligned response;
   returning the new enhanced prompt;
   executing the test language model on the new enhanced prompt to generate an enhanced output, wherein the enhanced output comprises an alignment metric, as determined by the judge language model, that is in alignment with a metric threshold; and
   returning the enhanced output.

\* \* \* \* \*